United States Patent
Ohishi et al.

(10) Patent No.: US 10,659,703 B2
(45) Date of Patent: May 19, 2020

(54) IMAGING DEVICE AND IMAGING METHOD FOR CAPTURING A VISIBLE IMAGE AND A NEAR-INFRARED IMAGE

(71) Applicant: JVC KENWOOD Corporation, Yokohama-shi, Kanagawa (JP)

(72) Inventors: Kouji Ohishi, Yokohama (JP); Hideki Tengeiji, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 0 days.

(21) Appl. No.: 15/863,170

(22) Filed: Jan. 5, 2018

(65) Prior Publication Data
US 2018/0278857 A1    Sep. 27, 2018

(30) Foreign Application Priority Data
Mar. 23, 2017    (JP) .................................. 2017-057054

(51) Int. Cl.
| | |
|---|---|
| *H04N 5/33* | (2006.01) |
| *G02B 27/10* | (2006.01) |
| *G02B 5/22* | (2006.01) |
| *G01N 21/64* | (2006.01) |
| *G02B 5/20* | (2006.01) |
| *H04N 9/097* | (2006.01) |

(52) U.S. Cl.
CPC ......... *H04N 5/332* (2013.01); *G01N 21/6456* (2013.01); *G02B 5/201* (2013.01); *G02B 5/22* (2013.01); *G02B 27/1013* (2013.01); *H04N 9/097* (2013.01)

(58) Field of Classification Search
CPC ...... G02B 27/1013; G02B 5/201; G02B 5/22; G01N 21/6456; H04N 5/332; H04N 9/097; A61B 5/0059; A61B 5/0071; A61B 5/0086; A61B 1/043; A61B 1/05; A61B 1/063; A61B 1/0638; A61B 1/00186; G01T 1/1603
See application file for complete search history.

(56) References Cited

U.S. PATENT DOCUMENTS

| | | | | |
|---|---|---|---|---|
| 5,555,464 A | * | 9/1996 | Hatlestad ............ | A01M 7/0089 348/266 |
| 7,375,803 B1 | * | 5/2008 | Bamji ................... | G01S 7/4816 356/4.01 |

(Continued)

FOREIGN PATENT DOCUMENTS

JP    2005-229317 A    8/2005

*Primary Examiner* — Tat C Chio
*Assistant Examiner* — Joon Kwon
(74) *Attorney, Agent, or Firm* — Brundidge & Stanger, P.C.

(57) ABSTRACT

An illumination radiates a visible light or a near-infrared light. A lens images a light from a subject. A beam splitter disperses the visible light and the near-infrared light. A color imaging device images a reflecting light from the subject illuminated with the visible light and includes an imaging device having a red filter. A black-and-white imaging device images the near-infrared light dispersed by the beam splitter. A pixel pitch of the black-and-white imaging device that images the near-infrared light dispersed is larger than a pixel pitch of the color imaging device. A sampling position for the near-infrared light is displaced in a pixel arrangement horizontally or vertically with respect to a sampling position for red in a color image.

6 Claims, 11 Drawing Sheets

(56) References Cited

U.S. PATENT DOCUMENTS

| | | | |
|---|---|---|---|
| 9,094,567 B2* | 7/2015 | Olson | H04N 5/332 |
| 9,173,554 B2* | 11/2015 | Fengler | A61B 1/00186 |
| 10,205,892 B2* | 2/2019 | Darty | G01J 3/0294 |
| 2002/0035330 A1* | 3/2002 | Cline | A61B 1/00009 |
| | | | 600/476 |
| 2006/0108509 A1* | 5/2006 | Frangioni | A61B 5/0059 |
| | | | 250/208.1 |
| 2007/0194121 A1* | 8/2007 | Yang | G06K 7/10722 |
| | | | 235/454 |
| 2007/0284532 A1* | 12/2007 | Nakanishi | G01J 3/36 |
| | | | 250/339.02 |
| 2008/0266652 A1* | 10/2008 | Yazdanfar | G02B 21/245 |
| | | | 359/363 |
| 2009/0250611 A1* | 10/2009 | Strandemar | H04N 5/33 |
| | | | 250/330 |
| 2010/0141770 A1* | 6/2010 | Gomi | H04N 5/2254 |
| | | | 348/164 |
| 2010/0295947 A1* | 11/2010 | Boulanger | H04N 5/332 |
| | | | 348/164 |
| 2011/0298951 A1* | 12/2011 | Yoshikawa | H04N 5/2258 |
| | | | 348/234 |
| 2012/0268573 A1* | 10/2012 | Schonborn | A61B 1/051 |
| | | | 348/49 |
| 2013/0041216 A1* | 2/2013 | McDowall | G02B 5/04 |
| | | | 600/109 |
| 2013/0044126 A1* | 2/2013 | Yamada | H04N 7/183 |
| | | | 345/629 |
| 2014/0184808 A1* | 7/2014 | Ryoki | H01L 27/14621 |
| | | | 348/164 |
| 2015/0189192 A1* | 7/2015 | Jonsson | G06T 5/50 |
| | | | 348/164 |
| 2016/0161599 A1* | 6/2016 | Seliuchenko | G01S 7/484 |
| | | | 250/338.4 |
| 2016/0254300 A1* | 9/2016 | Wajs | H01L 27/14607 |
| | | | 257/435 |
| 2016/0377545 A1* | 12/2016 | Wang | H04N 5/2251 |
| | | | 250/459.1 |
| 2017/0176336 A1* | 6/2017 | Dimitriadis | A61B 1/043 |
| 2018/0309919 A1* | 10/2018 | Naing | H04N 5/2353 |

* cited by examiner

FIG. 10A

|   |   |   |   |   |   |
|---|---|---|---|---|---|
| G | R | G | R | G | R |
| B | G | B | G | B | G |
| G | R | G | R | G | R |
| B | G | B | G | B | G |
| G | R | G | R | G | R |

FIG. 10B

|    |    |    |
|----|----|----|
| IR | IR | IR |
| IR | IR | IR |

FIG. 10C

|    |    |    |
|----|----|----|
| IR | IR | IR |
| IR | IR | IR |

(with R pixels overlaid at grid intersections)

IMAGING DEVICE AND IMAGING METHOD FOR CAPTURING A VISIBLE IMAGE AND A NEAR-INFRARED IMAGE

BACKGROUND OF THE INVENTION

1. Field of the Invention

The present invention relates to imaging technology for near-infrared light images.

2. Description of the Related Art

Near-infrared light images are sometimes used in the field of medicine. Near-infrared light can be easily transmitted through a living body and so is suitable for observation of the depth of a living body. The condition in a living body can be observed by injecting a test reagent called indocyanine green (ICG), which emits near-infrared fluorescent light when excited by near-infrared light, into the body and capturing the fluorescent light from the ICG with an infrared camera.

Patent document 1 discloses an imaging device that synthesizes visible light data and infrared light data captured in images such that positional gaps between corresponding imaging areas in a visible light image and an infrared light image are minimized, and displays synthesized image data.

[patent document 1] JP2005-229317

For the purpose of capturing a high-resolution image, there is a practice of reducing the pixel pitch in a visible light imaging device to increase the number of pixels. Meanwhile, it is necessary for the pixel pitch of a near-infrared light imaging device to be larger than that of a visible light imaging device in order to secure imaging sensitivity for near-infrared light. This results in a lower resolution and incompatibility with a larger number of pixels of the visible light imaging device. For this reason, there is a practice of providing a visible light camera and a near-infrared camera independently, capturing a high-resolution visible light color image and a low-resolution near-infrared light black-and-white image separately, and switching from one image to the other for display, or, alternatively, superimposing a visible light color image and a near-infrared black-and-white image for display.

SUMMARY OF THE INVENTION

In this background, a general purpose of the present invention is to provide a technology capable of enhancing the resolution of a near-infrared light image without lowering the imaging sensitivity for near-infrared light.

To address the aforementioned issue, an imaging device according to an embodiment comprises: an optical system (30) that images a light from a subject; a beam splitter (25) that disperses near-infrared light; a color imaging device (50) that has a red filter; and an imaging device (60) that images the near-infrared light dispersed. A pixel pitch of the imaging device that images the near-infrared light dispersed is larger than a pixel pitch of the color imaging device that has the red filter, and a sampling position for the near-infrared light is displaced in a pixel arrangement horizontally or vertically with respect to a sampling position for red in a color image.

Another embodiment of the present invention relates to an imaging method. The method is for capturing a near-infrared light image by using an optical system that images a light from a subject in an imaging device, and comprises: imaging a light transmitted through a beam splitter in an imaging device having a red filter; and imaging a near-infrared light dispersed by the beam splitter. A pixel pitch of the imaging device that images the near-infrared light dispersed is larger than a pixel pitch of the color imaging device that has the red filter, the imaging method further comprising: synthesizing an image captured by the imaging device that images the near-infrared light dispersed with an image captured by the imaging device having the red filter such that pixels of the image captured by the imaging device that images the near-infrared light dispersed are displaced with respect to the pixels of the image captured by the imaging device having the red filter.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 10A, 10B, and 10C show a method of synthesizing the near-infrared light image of the color imaging device and the near-infrared light image of the black-and-white imaging device by displacing pixels.

DETAILED DESCRIPTION OF THE INVENTION

The invention will now be described by reference to the preferred embodiments. This does not intend to limit the scope of the present invention, but to exemplify the invention.

The technology that represents a prerequisite of the embodiment of the present invention will be described with reference to FIGS. 1-7.

Figure 1:
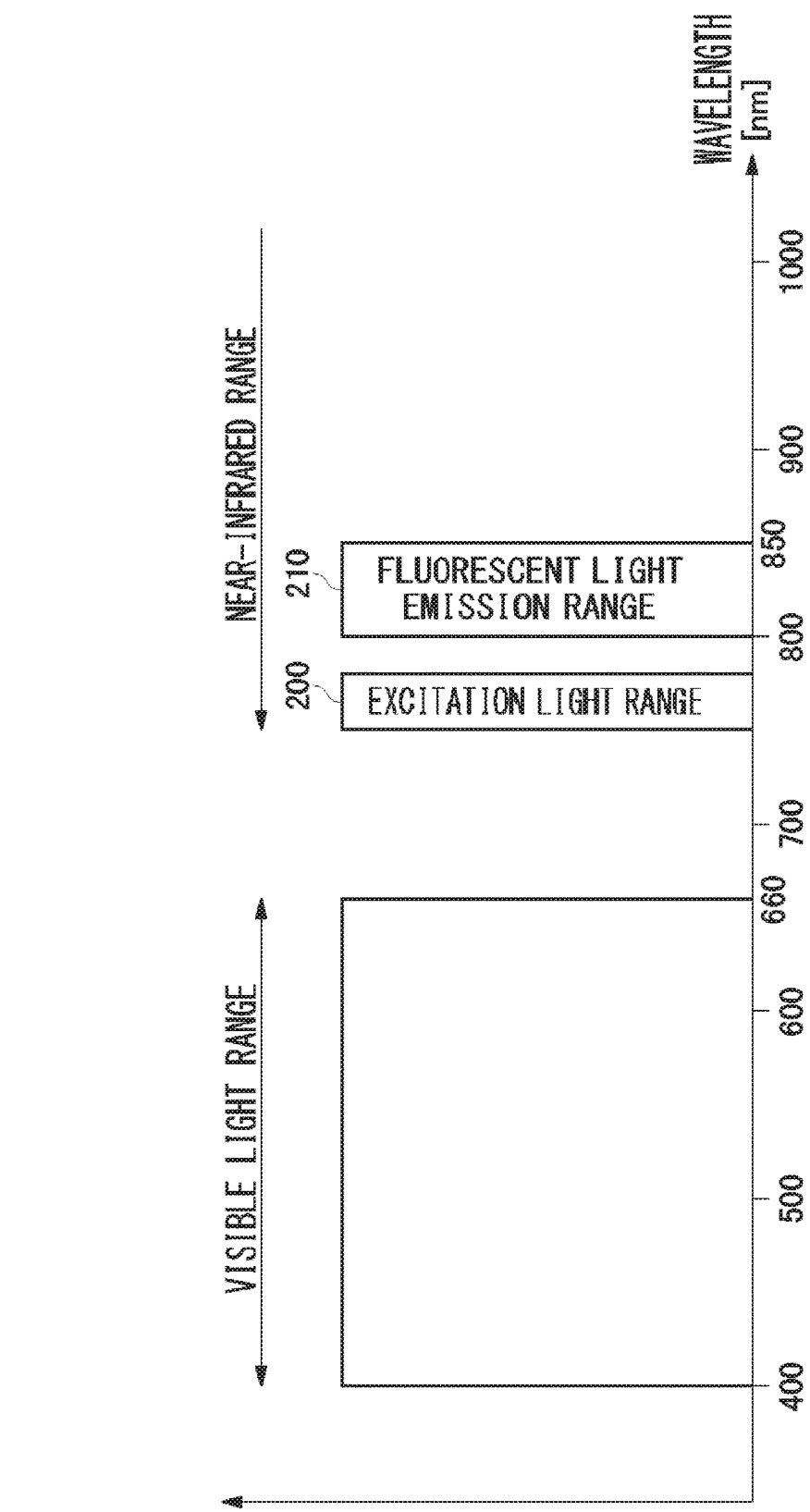
FIG. 1 is a diagram illustrating wavelength ranges of visible light and near-infrared light.

FIG. 1 is a diagram illustrating wavelength ranges of visible light and near-infrared light. The wavelength range of light is grouped into an ultraviolet range, visible light range, near-infrared range, mid-infrared range, and far-infrared range in the ascending order of the wavelength. The wavelength of 400~660 nanometer (nm) is in the visible light range that human eyes are capable of recognizing. The range with longer wavelengths is the infrared range. Reference numeral 200 denotes an excitation light range and reference numeral 210 denotes a fluorescent light emission range. In the field of medicine, near-infrared light that can be easily transmitted through a living body easily is used to observe the interior of a living body. By way of one example, there is a practice of injecting a test reagent called indocyanine green (ICG), which is excited by near-infrared light and emits near-infrared fluorescent light having a wavelength different from that of the excitation light, into the body, radiating an excitation light, and observing emission of the near-infrared light. For this purpose, it is necessary to capture only fluorescent light emission invisible to the eyes and exclude the excitation light.

Figure 2:
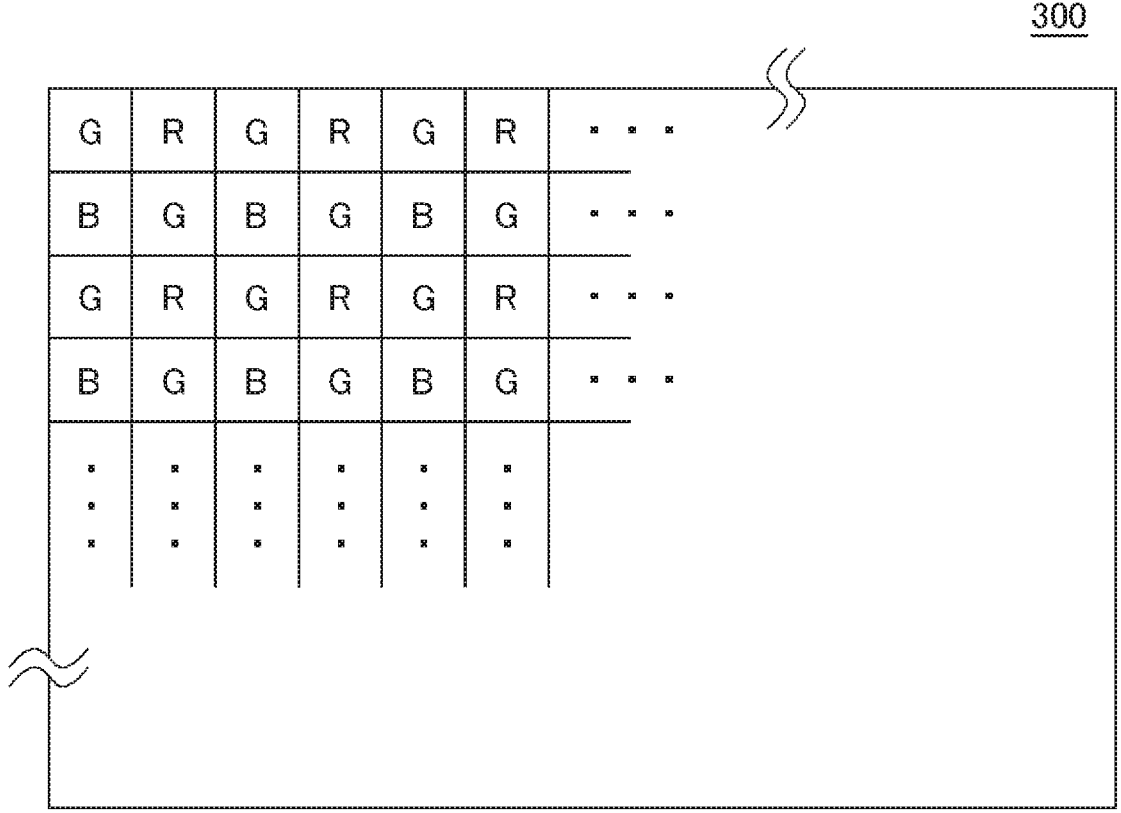
FIG. 2 is a diagram illustrating a color filter provided on the front face of an image sensor.

FIG. 2 is a diagram illustrating a color filter 300 provided on the front face of an image sensor. The color filter 300 is an RGB filter in which R (red), G (green), and B (blue) color filters are arranged in a Bayer array as shown. Behind the RGB filter is a photodiode of an image sensor, which converts the light transmitted through the respective color filters into electric charge. The collected electric charge is converted into an electric signal, and an RGB color image is created by signal processing.

Figure 3:
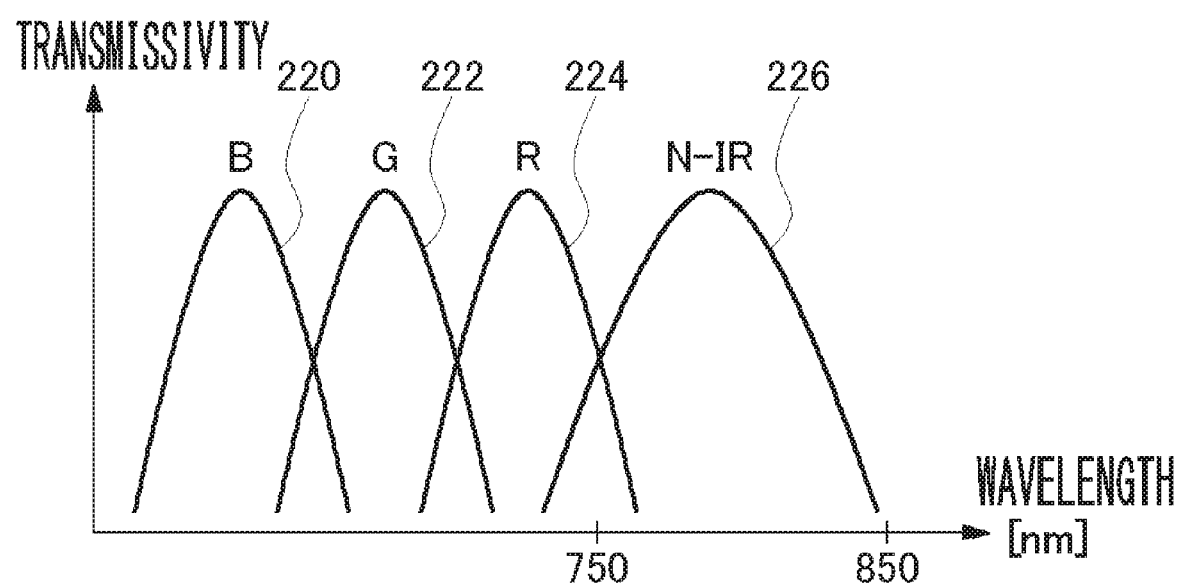
FIG. 3 is a graph showing the transmission characteristics of the color filter.

FIG. 3 is a graph showing the transmission characteristics of the color filter 300. The horizontal axis represents the wavelength and the vertical axis represents the transmissivity. Reference numeral 220 denotes the transmission characteristic of a blue filter, reference numeral 222 denotes the transmission characteristic of a green filter, and reference 224 denotes the transmission characteristic of a red filter. For information, reference numeral 226 denotes the transmission characteristics of a near-infrared light filter that transmits near-infrared light.

The size of one pixel unit of an image sensor is called a pixel pitch. To produce a high-resolution image, the number of pixels in an image sensor need be increased so that the pixel pitch has become smaller recently. On the other hand, the sensitivity of a sensor is generally lowered when the pixel pitch is reduced.

Figure 4:
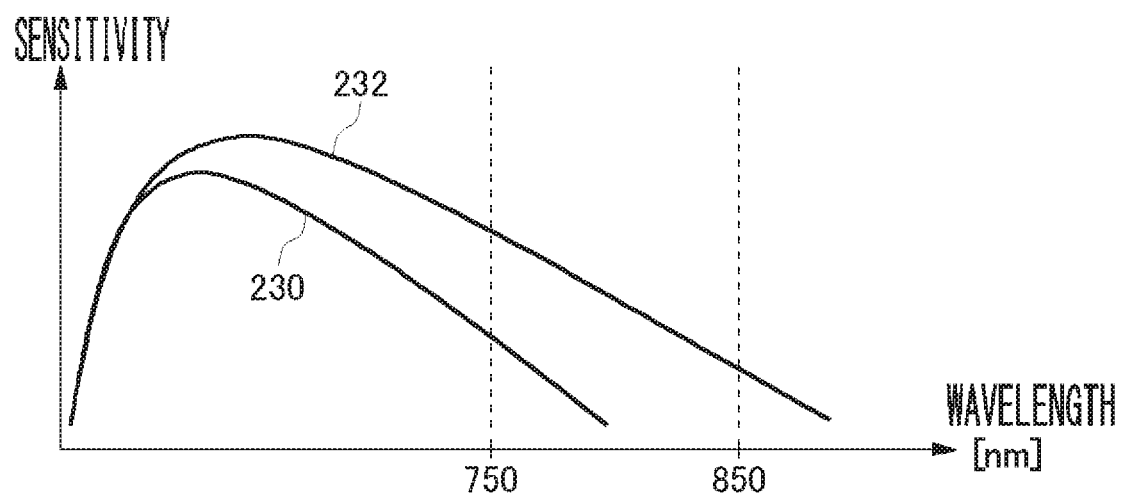
FIG. 4 is a graph showing a relationship between the pixel pitch and the sensitivity of an image sensor.

FIG. 4 is a graph showing a relationship between the pixel pitch and the sensitivity of an image sensor. The horizontal axis represents the wavelength and the vertical axis represents the sensitivity. When the pixel pitch is small, the sensitivity of an image sensor in response to the wavelength of light is plotted in a graph indicated by reference numeral 230. By way of contrast, when the pixel pitch is large, the sensitivity of an image sensor in response to the wavelength of light is plotted in a graph indicated by reference numeral 232. The larger the pixel pitch, the higher the sensitivity of the sensor. The sensitivity of the image sensor is lowered toward longer wavelengths of light and drops drastically particularly in the near-infrared range. In order to capture an image of near-infrared light with a sufficient sensitivity, it is necessary to increase the pixel pitch. This is incompatible with the requirement for larger number of pixels in the image sensor for imaging in the visible light range. Therefore, an ordinary practice is to prepare a visible light color imaging device with a smaller pixel pitch (a larger number of pixels) and a near-infrared light black-and-white imaging device with a smaller pixel pitch (a fewer number of pixels) independently and to acquire a high-resolution visible light image and a low-resolution near-infrared light image separately.

Figure 5A:
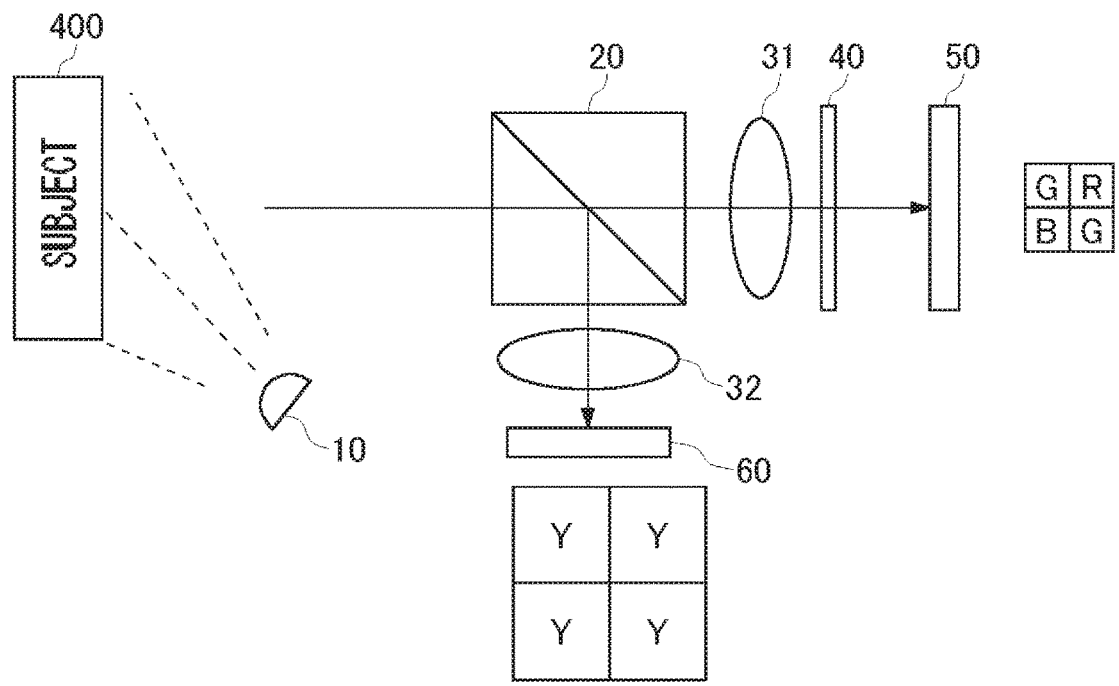
FIGS. 5A and 5B show configurations of imaging devices that capture a visible light image and a near-infrared light image independently.
Figure 5B:
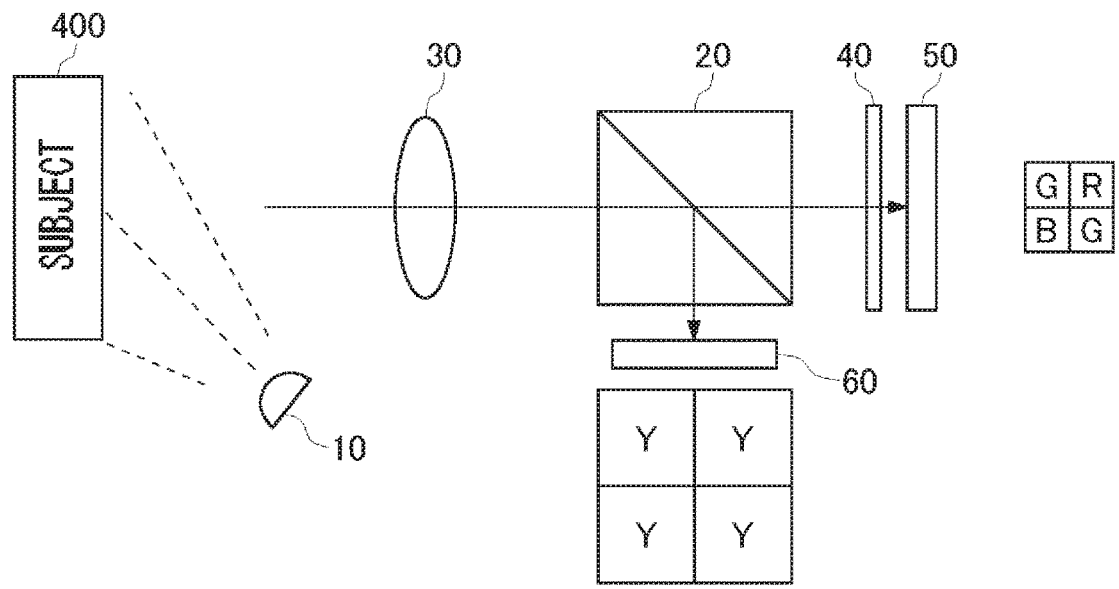

FIGS. 5A and 5B show configurations of imaging devices that capture a visible light image and a near-infrared light image independently. A description will first be given of a configuration of the imaging device of FIG. 5A. An illumination device 10 illuminates a subject 400 with an excitation light in the visible light range or near-infrared range. A beam splitter 20 is an optical device that transmits visible light and reflects infrared light.

The reflected light from the subject 400 illuminated with the visible light is transmitted through the beam splitter 20 and is imaged by a lens 31 in a color imaging device 50. Between the lens 31 and the color imaging device 50 is provided a UV-IR filter 40 that cuts the light in the ultraviolet and infrared ranges. The color imaging device 50 captures a visible light image.

Figure 6A:
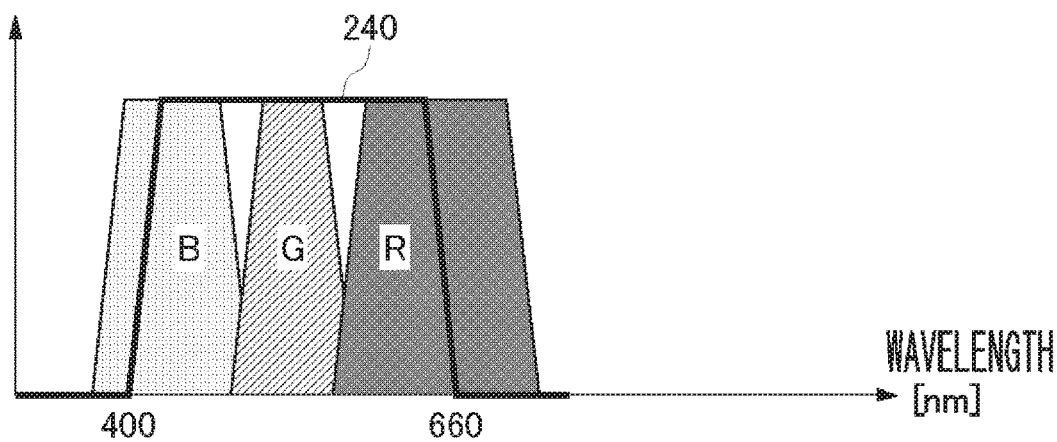
FIGS. 6A and 6B are graphs showing the filter characteristics of the UV-IR filter.
Figure 6B:
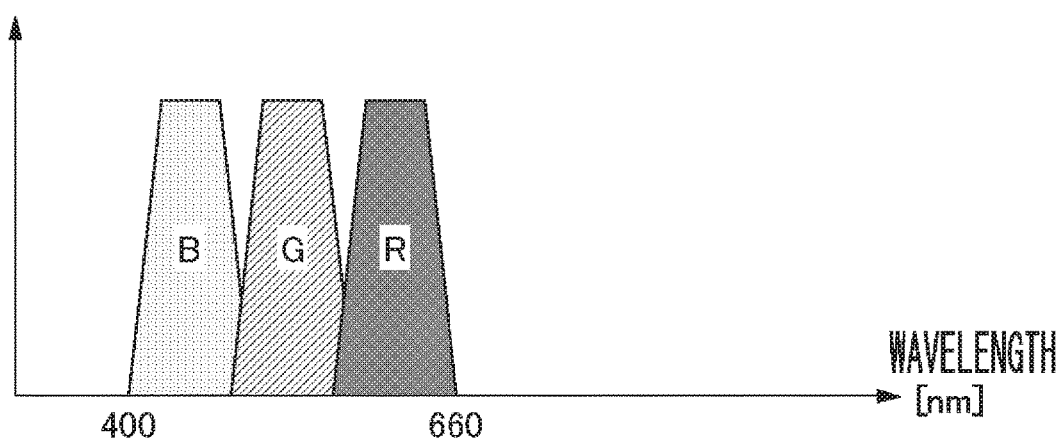

A description will now be given of the filter characteristics of the UV-IR filter 40 with reference to FIGS. 6A and 6B. The horizontal axis represents the wavelength and the vertical axis represents the transmissivity. Reference numeral 240 denotes a visible light range. According to the characteristics of the RGB filter of the color imaging device, the blue filter transmits a portion of light in the ultraviolet range in addition to blue light in the visible light range, and the red filter transmits a portion of light in the near-infrared range in addition to red light in the visible light range. The UV-IR filter 40 is a band-stop filter provided to cut unnecessary light outside the visible light range. The UV-IR filter 40 transmits visible light of 400 nm~660 nm and cuts ultraviolet light under 400 nm and infrared light over 660 nm. An IR filter that cuts only infrared light may be used as the cut filter. Further, in a closed environment that does not admit natural light inside, the wavelength of a light source may be limited to cut light in the infrared light range.

Reference is made back to FIG. 5A. The fluorescent light from the subject 400 illuminated with the excitation light is reflected by a reflective coating of the beam splitter 20 and imaged by a lens 32 in a black-and-white imaging device 60. The black-and-white imaging device 60 captures a near-infrared light image. In order to enhance the imaging sensitivity for near-infrared light, the pixel pitch of the black-and-white imaging device 60 need be larger than the pixel pitch of the color imaging device 50. Therefore, given that the sizes of the sensors are the same, the number of pixels in the black-and-white imaging device 60 is smaller than the number of pixels in the color imaging device 50, and the resolution of the near-infrared light image captured by the black-and-white imaging device 60 is lower than the resolution of the visible light image captured by the color imaging device 50.

Figure 7:
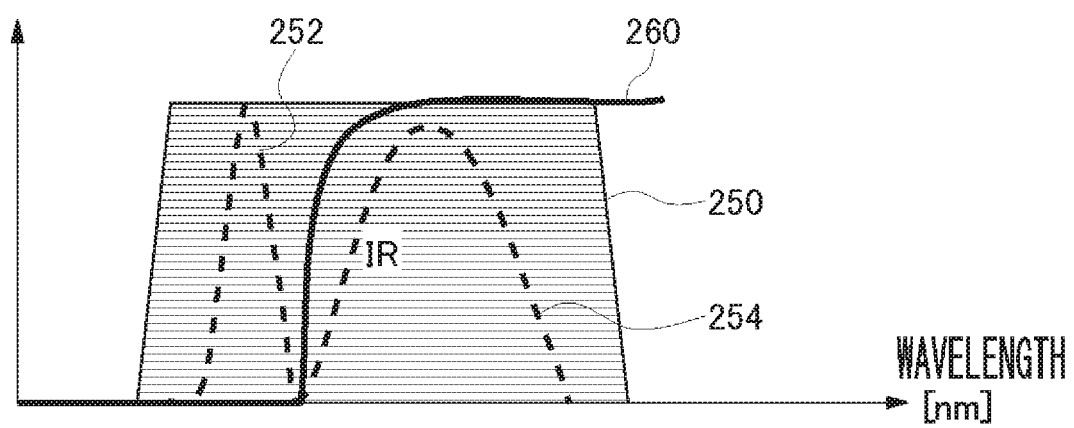
FIG. 7 is a graph showing the spectral characteristics of the reflective coating of the beam splitter.

A description will now be given of the spectral characteristics of the reflective coating of the beam splitter 20 with reference to FIG. 7. The horizontal axis represents the wavelength and the vertical axis represents the transmissivity. Reference numeral 250 denotes a near-infrared light range. Reference numeral 252 denotes the spectrum of near-infrared excitation light and reference numeral 254 denotes the spectrum of near-infrared fluorescent light. The reflective coating of the beam splitter 20 has characteristics of a short-pass filter as indicated by reference numeral 260. The reflective coating transmits visible light and guide it to the color imaging device 50, and reflects near-infrared light and guides it to the black-and-white imaging device 60 for near-infrared light. Further, the wavelength band of the reflective coating of the beam splitter 20 is conditioned to transmit, of the near-infrared light, the excitation light 252 and reflect the fluorescent light 254. This enables the black-and-white imaging device 60 to image only the light in the fluorescent range.

The imaging device of FIG. 5a captures a visible light image with the color imaging device 50 and captures a near-infrared light image with the black-and-white imaging device 60. The imaging device switches between the visible light image and the near-infrared light image for output.

The imaging device of FIG. 5B is identical to the imaging device of FIG. 5A in that the color imaging device 50 captures a visible light image and the black-and-white imaging device 60 captures a near-infrared light image independently. The imaging device of FIG. 5B differs in that a common lens 30 is used for imaging in the color imaging device 50 and the black-and-white imaging device 60 so that the visible light image and the near-infrared light image can be superimposed for display. The other features are identical to those of the imaging device of FIG. 5A.

Figure 8:
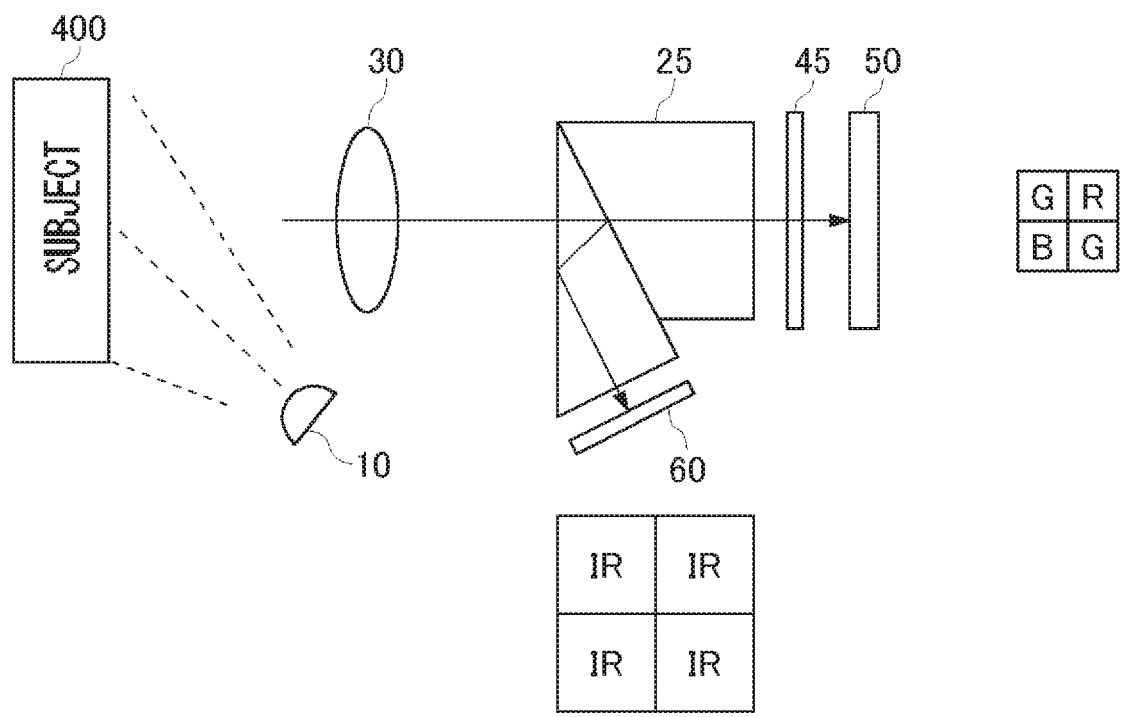
FIG. 8 shows a configuration of the imaging device according to the embodiment.

FIG. 8 shows a configuration of the imaging device according to the embodiment. The illumination device 10 illuminates the subject 400 with an excitation light in the visible light range or near-infrared light range. A beam splitter 25 is an optical device that transmits a portion of visible light and infrared light and reflects the remaining infrared light.

The reflected light from the subject 400 illuminated with a visible light is transmitted through the beam splitter 25 via the lens 30 and is imaged in the color imaging device 50. Between the beam splitter 25 and the color imaging device 50 is provided a band-stop filter 45 that cuts a specific band. The band-stop filter 45 transmits a portion of visible light and near-infrared light. Therefore, when a visible light is radiated, the color imaging device 50 captures a visible light image. When an excitation light in the near-infrared light range is radiated, the color imaging device 50 captures a near-infrared light image.

Figure 9A:
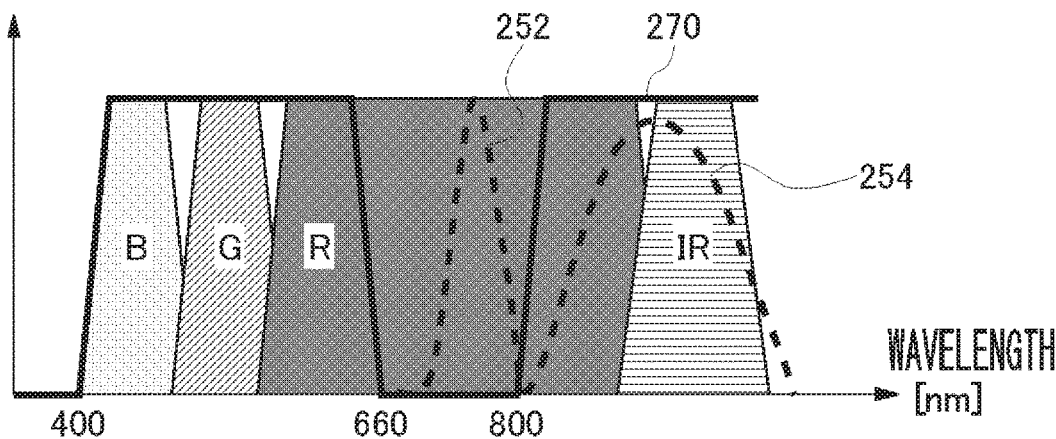
FIGS. 9A, 9B, and 9C are graphs showing the filter characteristics of the band-stop filter of FIG. 8.

The filter characteristics of the band-stop filter 45 will be described with reference to FIGS. 9A, 9B, and 9C. The horizontal axis represents the wavelength and the vertical axis represents the transmissivity. Reference numeral 270 denotes a range of light transmitted by the band-stop filter 45. As shown in FIG. 9A, the band-stop filter 45 cuts ultraviolet light under 400 nm, and cuts near-infrared light of 660 nm~800 nm in order to cut the excitation light 252 illuminating the subject. However, the band-stop filter 45 transmits near-infrared light of 800 nm and over in order to image a portion of the fluorescent light 254 from the subject.

Figure 9B:
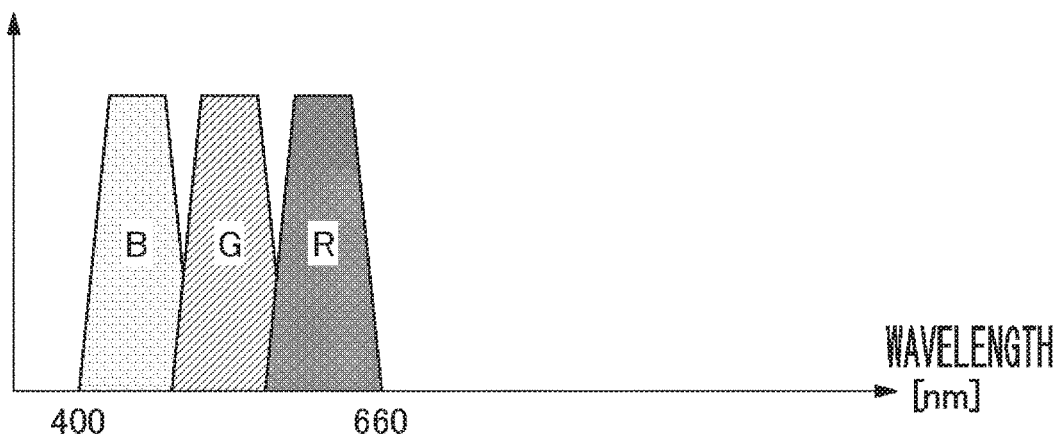
Figure 9C:
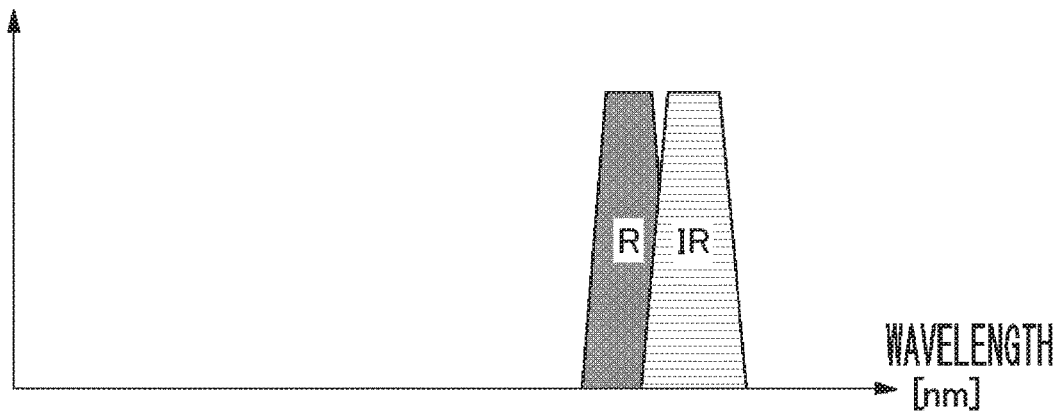

As a result, the R, G, B visible light is transmitted as shown in FIG. 9B so that a visible light image is captured, when a visible light is radiated. When an excitation light in the near-infrared range is radiated, a portion of the fluorescent light in the near-infrared range is transmitted by the red filter as shown in FIG. 9C so that a near-infrared light image is captured.

Reference is made back to FIG. 8. The fluorescent light from the subject 400 illuminated with the excitation light is reflected by the reflective coating of the beam splitter 25 via the lens 30, reflected again by the wall of the beam splitter 25, and imaged in the black-and-white imaging device 60. One-time reflection flips an image horizontally. By configuring the device to reflect the light twice, a non-inverted image is captured in the black-and-white imaging device 60. In order to enhance the imaging sensitivity for near-infrared light, the pixel pitch of the black-and-white imaging device 60 need be larger than the pixel pitch of the color imaging device 50.

The spectral characteristics of the beam splitter 25 are as described with reference to FIG. 7. In essence, the reflective coating of the beam splitter 25 transmits visible light, transmits, of the near-infrared light, the excitation light 252, and reflects the fluorescent light 254.

By conditioning the wavelength band dispersed by the reflecting coating of the beam splitter 25, a portion of fluorescent light 254 is transmitted and imaged in the color imaging device 50, and the remaining fluorescent light 254 is reflected and imaged in the black-and-white imaging device 60. The half-power wavelength dispersed by the reflecting coating is set to be the wavelength substantially half the wavelength band of the fluorescent light 254 or longer. Since the pixel pitch of the color imaging device 50 is smaller than that of the black-and-white imaging device 60, the sensitivity of the color imaging device 50 imaging the fluorescent light 254 is lower than the sensitivity of the black-and-white imaging device 60. For this reason, it is preferable to condition the half-power value of the wavelength dispersed by the reflecting coating in a direction to increase the sensitivity of the color imaging device 50 so as to improve the S/N ratio of the color imaging device 50. In essence, it is preferable that the half-power value of the wavelength dispersed by the reflecting coating be larger than the wavelength substantially half the wavelength band of the fluorescent light 254 so as to cause more fluorescent light 254 to be incident on the color imaging device 50 than on the black-and-white imaging device 60.

By configuring the spectral characteristics of the beam splitter 25 and the filter characteristics of the band-stop filter 45 as described above, a portion of the fluorescent light 254 is imaged in the red imaging device of the color imaging device 50 and the remaining fluorescent light 254 is imaged in the black-and-white imaging device 60, when the subject 400 is illuminated with the excitation light 252 and the fluorescent light 254 is imaged.

FIGS. 10A, 10B, and 10C show a method of synthesizing the near-infrared light image of the color imaging device 50 and the near-infrared light image of the black-and-white imaging device 60 by displacing pixels. In the color imaging device 50, R, G, B pixels are arranged as shown in FIG. 10A. Meanwhile, the black-and-white imaging device 60 has a larger pixel pitch than the color imaging device 50 and includes an arrangement of pixels indicating the luminance of near-infrared light as shown in FIG. 10B. It is assumed here that the pixel pitch of the black-and-white imaging device 60 is twice the pixel pitch of the color imaging device 50.

In near-infrared light imaging, near-infrared light is additionally imaged in the R pixels of the color imaging device 50 of FIG. 10A. Therefore, a near infrared-light image can be acquired by synthesizing the R pixels with the pixels of the black-and-white imaging device 60 of FIG. 10B. The resolution of the black-and-white imaging device 60 of FIG. 10B is half the resolution of the color imaging device 50 of FIG. 10A. By synthesizing the pixels of the black-and-white imaging device 60 of FIG. 10B with the R pixels of the color imaging device of FIG. 10A such that the pixels are displaced by a half pixel (half the pixel pitch of the color imaging device 50), the resolution is increased without lowering the near-infrared sensitivity.

FIG. 10C shows an image produced by synthesizing the pixels of the black-and-white imaging device 60 with the R pixels of the color imaging device 50 with a displacement of a half pixel. By synthesizing the near-infrared light image captured in the R pixels of the color imaging device 50 with the pixels of the black-and-white imaging device 60 with a displacement of a half pixel, the resolution of the near-infrared light image of the black-and-white imaging device 60 will be identical to the resolution of the visible light image of the color imaging device 50. While it is preferable, in order to increase the resolution most, to displace the pixels of the black-and-white imaging device 60 from the R pixels of the color imaging device 50 by a half pixel, the resolution can also be increased by displacing the pixels of the black-and-white imaging device 60 from the R pixels of the color imaging device 50 by an amount other than a half pixel.

Speaking more generally, given that the pixel pitch of the black-and-white imaging device 60 is n times (n is a natural number) the pixel pitch of the color imaging device 50, the resolution of the near-infrared light image of the black-and-white imaging device 60 can match the resolution of the visible light image of the color imaging device 50 by synthesizing the pixels of the black-and-white imaging device 60 and the R pixels of the color imaging device 50 with a displacement of 1/n pixels.

If there is no need to increase the resolution, however, the near-infrared light image may be generated by synthesizing the pixels of the black-and-white imaging device 60 and the pixels of the color imaging device 50 without displacing pixels.

In the imaging device of FIG. 8, the lens 31 for the color imaging device 50 and the lens 32 for the black-and-white imaging device 60 may be provided separately as in the case of the imaging device of FIG. 5A. Further, the beam splitter 25 may be configured to reflect the light once instead of twice. In that case, an additional signal process of horizontally inverting the image captured by the black-and-white imaging device 60 may be performed when synthesizing the images with pixel displacement.

Figure 11:
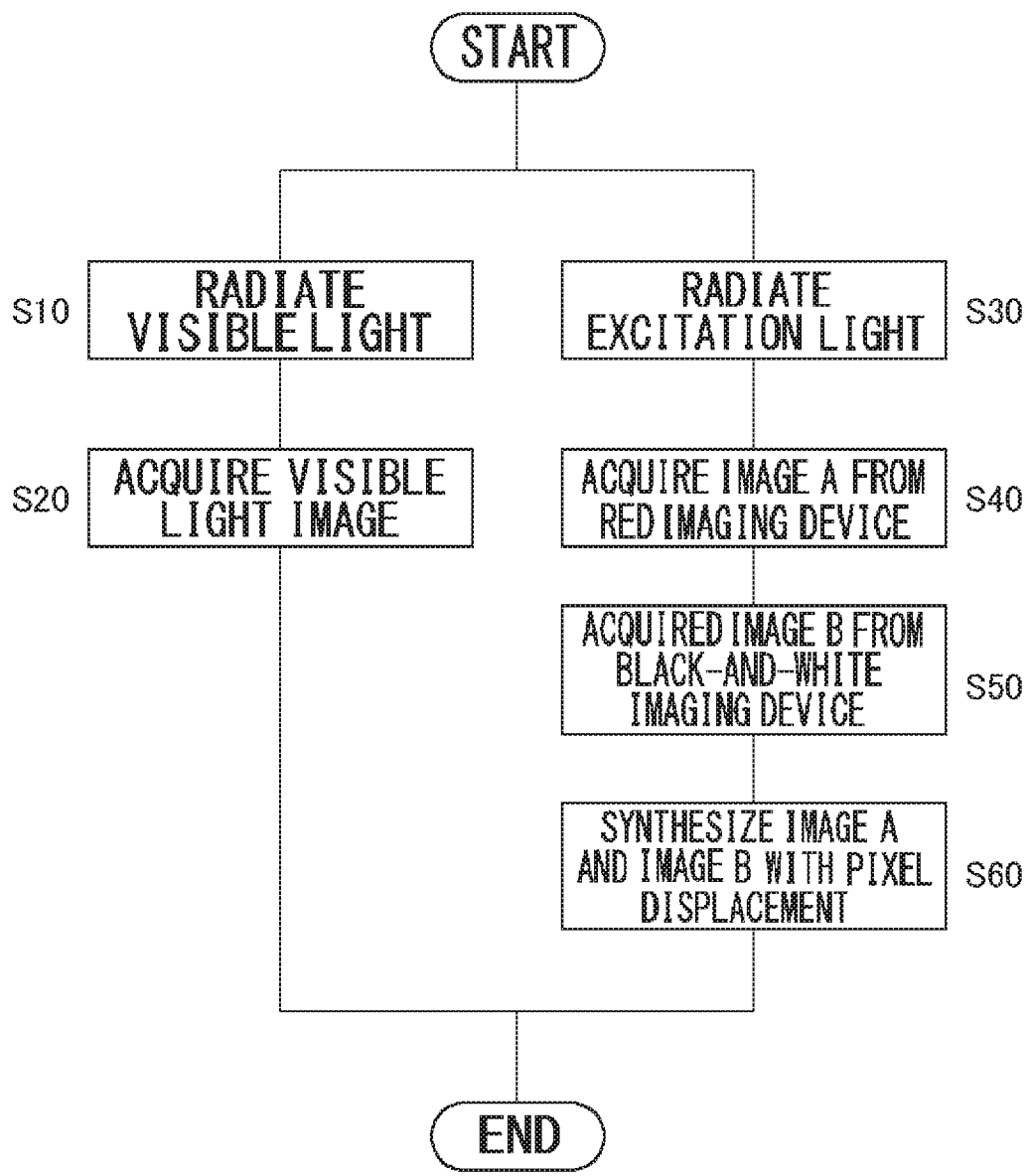
FIG. 11 is a flowchart showing the procedure for capturing a visible light image and a near-infrared light image by the imaging device according to the embodiment.

FIG. 11 is a flowchart showing the procedure for capturing a visible light image and a near-infrared light image by the imaging device according to the embodiment of FIG. 8.

The illumination device 10 illuminates the subject 400 with a visible light (S10). The visible light transmitted by the beam splitter 25 is transmitted through the band-stop filter 45 to cut unnecessary light in the ultraviolet range and the near-infrared range, and is imaged in the color imaging device 50 so that a visible light image is captured (S20).

The illumination device 10 illuminates the subject 400 with a visible light (S30). Of the near-infrared light transmitted by the beam splitter 25, the excitation light is cut by the band-stop filter 45, and the fluorescent light is imaged in the imaging device of the color imaging device 50 having a red filter so that a near-infrared light image A is captured by the red imaging device (S40).

Of the near-infrared light, the reflective coating of the beam splitter 25 transmits the excitation light and reflects the fluorescent light. The reflected fluorescent light is imaged in the black-and-white imaging device 60 so that a near-infrared light image B is captured in the black-and-white imaging device 60 (S50). The near-infrared light image B captured in the black-and-white imaging device 60 has a lower resolution than the visible light image captured by the color imaging device 50.

By synthesizing the near-infrared light image A captured by the red imaging device of the color imaging device 50 with the near-infrared light image B captured by the black-and-white imaging device 60 such that the pixels of the near-infrared light image A are displaced with respect to the pixels of the near-infrared image B, a near-infrared light image having the same resolution as the visible light image is produced (S60).

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment described above, the near-infrared light image is produced by imaging the fluorescent light from the excitation light. Image synthesis with pixel displacement according to the embodiment may be applied to the case of capturing a near-infrared light image by an ordinary infrared camera that does not use an excitation light. In an ordinary camera, an IR filter is placed in front of the color imaging device to prevent infrared light from entering. When a visible image is captured without using the IR filter, infrared light enters an imaging device having a red filter. By using a filter that cuts a visible light band, it is possible for a color imaging device to capture an infrared light image. Therefore, the resolution can be increased without lowering the near-infrared sensitivity, by synthesizing the infrared light image captured by the color imaging device with the infrared light image captured by a black-and-white imaging device.

What is claimed is:

1. An imaging device comprising:
   an optical system that images a light from a subject;
   an illumination device that illuminates the subject with visible light or near-infrared light as excitation light;
   a beam splitter that disperses the infrared light that is emitted from the subject illuminated by the excitation light, into a first light in a first wavelength range, and a second light in a second wavelength range whose wavelength is longer than the first wavelength range;
   a color imaging device that has a red filter capable of imaging the near-infrared light and images the first light in the first wavelength range;
   a band-stop filter that is provided in front of the color imaging device and cuts a wavelength of the excitation light; and
   a near-infrared light imaging device that images the second light in the second wavelength range, wherein:
   a pixel pitch of the near-infrared light imaging device is larger than a pixel pitch of the color imaging device, and
   a sampling position of the near-infrared light imaging device is displaced in a pixel arrangement horizontally or vertically with respect to a sampling position for red of the color imaging device.

2. The imaging device according to claim 1, wherein:
   the pixel pitch of the near-infrared light imaging device is twice the pixel pitch of the color imaging device, and
   the sampling position of the near-infrared light imaging device is displaced in the pixel arrangement horizontally or vertically with respect to the sampling position for red of the color imaging device by a half pixel.

3. The imaging device according to claim 1, wherein the beam splitter reflects the second light in the second wavelength range an even number of times.

4. The imaging device according to claim 1, wherein a half-power wavelength dispersed by the beam splitter includes a wavelength that is half of a wavelength band of the fluorescent light dispersed or longer.

5. An imaging method for capturing a near-infrared light image by using an optical system that images a light from a subject in an imaging device, comprising:
   illuminating the subject with visible light or near-infrared light as excitation light;
   imaging a first light in a first wavelength range obtained from the near-infrared light that is emitted from the subject illuminated by the excitation light, being dispersed by a beam splitter in a color imaging device having a red filter capable of imaging the near-infrared light;

imaging a second light in a second wavelength range whose wavelength is longer than the first wavelength range dispersed by the beam splitter in a near-infrared light imaging device.

6. The imaging method according to claim 5, wherein a pixel pitch of the near-infrared light imaging device is larger than a pixel pitch of the color imaging device; and
further comprising synthesizing an image captured by the near-infrared light imaging device with an image captured by the color imaging device having the red filter such that pixels of the image captured by the near-infrared light imaging device are displaced with respect to the pixels of the image captured by the color imaging device having the red filter.

* * * * *